Jan. 24, 1967  N. I. E. GUSTAFSSON ETAL  3,299,717
GYROSCOPIC DEVICE

Filed Sept. 18, 1964  3 Sheets-Sheet 1

INVENTORS
NILS INGVAR EMANUEL GUSTAFSSON
AXEL ODELBERG

BY  Hane and Nydick

ATTORNEYS

United States Patent Office 3,299,717
Patented Jan. 24, 1967

3,299,717
GYROSCOPIC DEVICE
Nils Ingvar Emanuel Gustafsson and Axel Odelberg, Karlskoga, Sweden, assignors to Aktiebolaget Bofors, Bofors, Sweden, a Swedish company
Filed Sept. 18, 1964, Ser. No. 397,516
Claims priority, application Sweden, Oct. 11, 1963, 11,186/63
4 Claims. (Cl. 74—5.7)

The present invention relates to gyroscopes for guiding missiles and similar vehicles, and is more particularly concerned with a gyroscope which is adapted to be started by igniting a pyrotechnic charge arranged within the gyroscope body, so that the combustion gases generated by the charge cause the gyroscope to rotate.

More specifically, the invention relates to the arrangement of conducting wires through which an electric current is passed from an external source of current to an electric ignition device provided within the gyroscope body to ignite the charge. Hitherto such wires have generally been passed into the gyroscope through one of the jet nozzles through which the combustion gases are to flow out. The wires will then be torn off at the nozzle when the gyroscope starts to rotate.

According to the present invention, one of the pivots of the gyroscope has an axial bore through which the electric wires extend to the electric ignition device arranged within the gyroscope body. This has the advantage that the arrangement of the wires is simplified and the wires will not interfere with the gases flowing out of the jet nozzle. The wires will be twisted off immediately when the gyroscope starts to rotate and will not interfere with the rotation.

Suitably the wire portions which are outside of the gyroscope should be arranged so that immediately after being twisted off, they are removed from the vicinity of the gyroscope by means, which can be released, for instance when the missile or the like is launched, so that the loose wire ends will in no way obstruct the work of the gyroscope.

The invention will be explained more in detail with reference to the accompanying drawing, which illustrates a gyroscope for guiding a missile.

Figure 1:
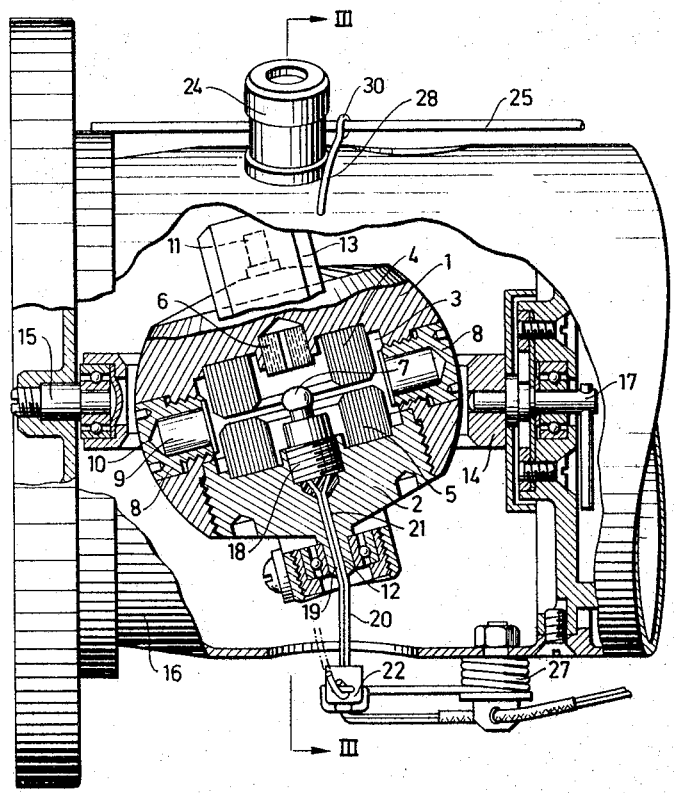
Figure 2:
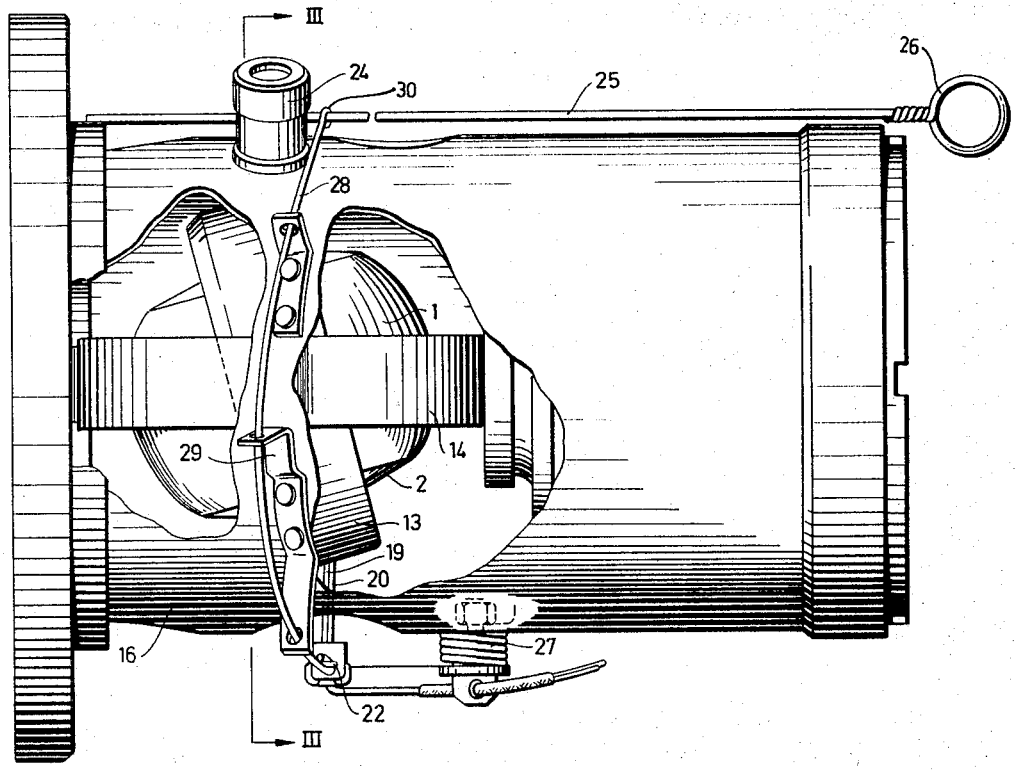
Figure 3:
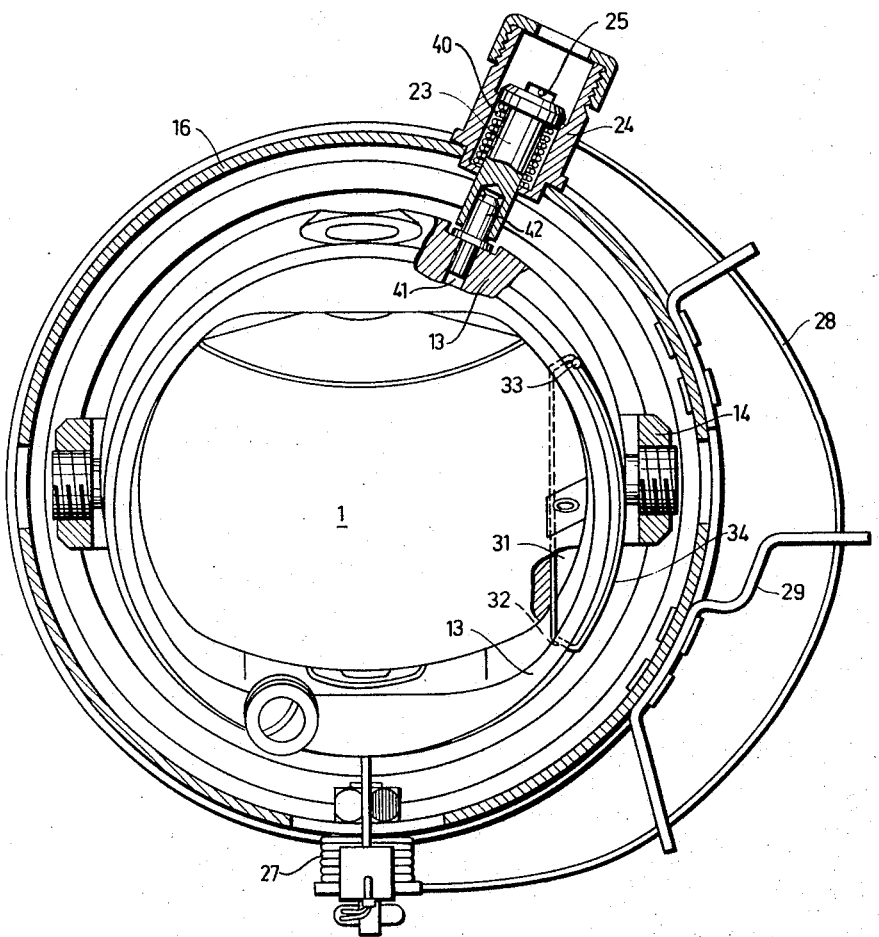

FIGURE 1 shows the gyroscope in longitudinal section.
FIGURE 2 shows an elevation of the gyroscope with parts broken away.
FIGURE 3 shows a cross-section along line III—III.

The gyroscope shown on the drawing is intended to be mounted in a missile to form part of the guidance system of the missile, more particularly to serve to establish a vertical reference line for guiding means of the missile. Since the function of a gyroscope in such connection is well known and per se is not a part of the present invention, the connections of the gyroscope to other guidance means of the missile have not been shown. It may only be remarked that generally the gyroscope will be started to rotate at a high speed of rotation before the missile is launched.

The gyroscope comprises a body of revolution comprised of two parts 1 and 2 which are joined together by screw-threads, and which together define an inner chamber 3, wherein two annular charges 4, 5, a primer charge 6 and an electric ignition device 7 are disposed. In the equatorial plane of the gyroscope body there are affixed two diametrically opposed nozzles 8 each having an axial bore 9 communicating with the chamber 3 and a tangential discharge outlet the inner end of which is seen at 10.

The pivots 11, 12 of the gyroscope are formed in the parts 1, 2 and are journalled by means of ball bearings in the inner gimbal 13 which in its turn is journalled in the outer gimbal 14 in a well-known manner. The gimbal 14 is journalled at one side by means of a ball bearing on a stationary shaft 15 mounted in a frame 16, and at the opposite side it carries a shaft 17, which is journalled in the frame 16 and is adapted to be connected to guidance means of the missile in a manner not shown.

The electric igniting device 7 is attached to a screw 18 which is secured in the part 2 and through which the conductors 19, 20 extend to the ignition charge. The conductor wires extend out from the gyroscope body through an axial bore 21 in the pivot 12 to a wire holder 22 and therefrom to the source of current, usually a battery (not shown).

When the missile is to be launched, a current is passed to the igniter 7 through the conductor wires 19, 20. The igniter ignites the primer 6 which in its turn ignites the charges 4, 5. The resulting combustion gases flow out through the bores 9 and the tangential bores 10 and cause the gyroscope body to rotate at a very high speed within a short time. As soon as the gyroscope body starts to rotate, it will twist off the wires 19 and 20 between the pivot 12 and the holder 22.

It is desirable that the broken loose wire ends thereafter be removed as soon as possible from the vicinity of the gyroscope body in order to eliminate any possibility for them to interfere with the movement of the gyroscope. In the embodiment shown, the means for releasing the gyroscope after launching the missile are in part utilized for this purpose. Before launching the missile, the gyroscope is maintained locked with its axis of rotation in a predetermined position and it is released only after launching the missile, which takes place when the gyroscope has achieved its full speed of rotation. The gyroscope is locked by means of a plunger 23 biased by a spring 40. The plunger is slidable in a cylinder 24 and mounts in its forward end a headed bolt 42 engaging a recess 41 in the gimbal 13 (FIGURE 3). In the embodiment illustrated, the gimbal is locked in a position such that the rotational axis of the gyroscope forms an angle less than 90° to the longitudinal axis of the frame 16 (which coincides with or is parallel to the longitudinal axis of the missile), the intention being that the missile is to be launched in a corresponding angle to the horizontal plane, so that the rotational axis of the gyroscope is substantially vertical when the missile is launched.

The locking plunger 23 is biased by its spring so that it tends to release the gimbal 13, but is maintained in its locking position by a rod 25 which passes through the cylinder 24. At its rear end the rod has an eye 26 which is intended to be attached to a member provided on the stationary launching equipment for the missile, so that the rod 25 is pulled out and releases the locking plunger 23 when the missile starts to move.

The wire holder 22 referred to above is attached to an end of a helical spring 27 which tends to turn so that its end and thus the holder 22 moves inwardly from the plane of the drawing in FIGURES 1 and 2. It is restrained, however, by a wire 28 which is passed through suitable brackets 29 around the outer wall of the frame 16 and is attached by an eye 30 on the rod 25. Thus, when the rod 25 is pulled away, the wire 28 will also be released, so that it does not hold the holder 22, whereby the spring 27 is free to remove the wires 19, 20 by pulling the same out of casing 16.

To prevent the gyroscope from turning before it is to be started, which might result in the wires 19, 20 being twisted off prematurely, in which case the gyroscope could not be started, a slot 31 is provided in the body 1 and two holes 32, 33 are bores through the gimbal 14. A thread 34 is passed through the slot 31 and the holes 32, 33 to retain the gyroscope body in a fixed position. This thread is torn off when the gyroscope starts to rotate.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. In a device for guiding missiles and similar devices, a gyroscope having a rotor, means supporting said rotor for rotation about a spin axis, pivot means pivotally supporting said gyroscope, a pyrotechnical charge for starting rotation of said rotor about said spin axis, an electric igniter for igniting said charge, wire conductors for supplying ignition current to said igniter, a wire holder mounted spaced apart from the spin axis support, said pivot means having a bore therethrough and said wires being extended through said bore to said wire holder, whereby said wire conductors are broken between said bore of the spin axis support and said wire holder when the gyroscope begins to rotate about said spin axis, said holder being movable from said spaced apart first position into a second position farther away from the pivot means, means urging the wire holder into said second position, locking means releasably retaining the holder in the first position, and release means for releasing said locking means to free said holder for movement into said second position whereby the holder withdraws broken-off wire portions held by it from the rotational path of the gyroscope.

2. The device according to claim 1 wherein said means urging the wire holder into said second position comprise a loaded spring stationarily mounted at one end and supporting the wire holder at the other end, said spring in its loaded state holding the holder in its first position, and wherein said locking means comprise a member secured at one end to said spring to retain the same in its loaded state and at the other end to said release means for release of said member thereby freeing the spring for expansion, the spring in its expanded state holding the holder in its second position.

3. The device according to claim 1 and further comprising second locking means for retaining the gyroscope in a predetermined position prior to being rotated, said release means coacting with said second locking means also, to effect substantially simultaneous release of both locking means upon actuation of the release means.

4. The device according to claim 3 wherein said second locking means comprise a plunger engageable with a recess in the gyroscope and a spring biasing the plunger into a position withdrawn from said recess, and a release bar engaging said plunger to retain the same in its engaging position, and wherein said first mentioned locking means comprise an elongated locking member secured at one end to said bar to lock the same in its retaining position and at the other end to said means urging the wire holder into its farther apart position to render said means ineffective, said release means coacting with said bar to withdraw the same from the plunger and with said elongated member to render the latter ineffective for locking action.

References Cited by the Examiner
UNITED STATES PATENTS

| | | | |
|---|---|---|---|
| 2,986,945 | 6/1961 | Riola | 74—5.12 |
| 3,012,439 | 12/1961 | Ransom | 74—5.12 |

FOREIGN PATENTS

| | | |
|---|---|---|
| 98,885 | 11/1961 | Norway. |

FRED C. MATTERN, JR., *Primary Examiner.*

J. PUFFER, *Assistant Examiner.*